(12) United States Patent
Rauhala et al.

(10) Patent No.: US 10,129,261 B2
(45) Date of Patent: Nov. 13, 2018

(54) METHOD FOR SERVING LOCATION INFORMATION ACCESS REQUESTS

(75) Inventors: Petri Rauhala, Tampere (FI); Tommi Laine, Tampere (FI); Mikko Blomqvist, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1863 days.

(21) Appl. No.: 10/874,428

(22) Filed: Jun. 23, 2004

(65) Prior Publication Data

US 2005/0289095 A1 Dec. 29, 2005

(51) Int. Cl.
| | |
|---|---|
| G06Q 30/02 | (2012.01) |
| G06Q 10/10 | (2012.01) |
| G06Q 99/00 | (2006.01) |
| H04L 29/06 | (2006.01) |
| G06Q 50/26 | (2012.01) |
| G06Q 50/00 | (2012.01) |
| H04L 29/08 | (2006.01) |
| H04W 8/16 | (2009.01) |
| H04W 8/18 | (2009.01) |
| H04W 12/08 | (2009.01) |

(52) U.S. Cl.
CPC .......... *H04L 63/102* (2013.01); *G06Q 50/01* (2013.01); *G06Q 50/265* (2013.01); *H04L 63/107* (2013.01); *H04L 67/18* (2013.01); *H04L 67/306* (2013.01); *H04W 8/16* (2013.01); *H04W 8/18* (2013.01); *H04W 12/08* (2013.01)

(58) Field of Classification Search
CPC .............................. G06Q 50/01; G06Q 50/265
USPC ............................................... 705/1, 1.1–912
See application file for complete search history.

(56) References Cited

U.S. PATENT DOCUMENTS

| | | | |
|---|---|---|---|
| 7,013,148 B1* | 3/2006 | Ganesh ...................... 455/456.1 |
| 7,203,752 B2* | 4/2007 | Rice et al. .................... 709/225 |
| 2002/0035605 A1 | 3/2002 | McDowell et al. |
| 2002/0055852 A1* | 5/2002 | Little et al. ........................ 705/1 |
| 2002/0095312 A1* | 7/2002 | Wheat ............................... 705/1 |
| 2002/0156646 A1* | 10/2002 | Kaiwa et al. ..................... 705/1 |
| 2003/0023726 A1 | 1/2003 | Rice et al. |

FOREIGN PATENT DOCUMENTS

| | | |
|---|---|---|
| CN | 1337816 | 2/2002 |
| CN | 1337816 A | 2/2002 |
| EP | 1179950 | 2/2002 |
| WO | 0217656 * | 2/2002 |

(Continued)

OTHER PUBLICATIONS

F. Dawson, et al., "vCard MIME Directory Profile," Request for Comments: 2426, www.ietf.org/rfc/rfc2426.txt, Sep. 1998, 40 pages.

(Continued)

*Primary Examiner* — Jonathan P Ouellette
(74) *Attorney, Agent, or Firm* — Ditthavong & Steiner, P.C.

(57) ABSTRACT

The present invention relates to processing location information access requests. An identifier of a sender of a received location information access request is determined, and the identifier is compared to identifiers in a contact storage. Location access control information and/or supplementary contact information associated with an entry having a matching identifier in the contact storage is then retrieved.

25 Claims, 3 Drawing Sheets

(56) References Cited

FOREIGN PATENT DOCUMENTS

WO            0217656 A2     2/2002
WO     WO 02/17656 A2     2/2002

OTHER PUBLICATIONS

T. Howes, et al., "A MIME Content-Type for Directory Information,". Request for Comments 2425, www.ietf.org/rfc/rfc2425.txt, Sep. 1998, 31 pages.
Chinese Office Action for corresponding CN Application No. 200580020358.X, dated Jan. 8, 2010, China.
Chinese Office Action for corresponding CN Application No. 200580020358.X, dated Aug. 21, 2009, China.
Chinese Office Action for corresponding CN Application No. 200580020358.X, dated May 24, 2011, pp. 1-21.
Supplementary European Search Report for EP Application No. 05751989.4-2413 dated Dec. 8, 2011, pp. 1-3.
Notification of Reexamination for related Chinese Patent Application No. 200580020358.X dated Feb. 13, 2012, pp. 1-17.
Office Action for corresponding Chinese Application No. 201210505341.5, dated Oct. 10, 2014, 7 pages (English Language Summary Included).
European Office Action for related European Patent Application No. 05751989.4-1870 dated Jul. 4, 2016, 4 Pages.

* cited by examiner

METHOD FOR SERVING LOCATION INFORMATION ACCESS REQUESTS

FIELD OF THE INVENTION

The present invention relates to a method for serving location information access requests.

BACKGROUND OF THE INVENTION

Various applications utilizing location information have been developed in recent years. A positioning technique such as GPS (global positioning system) based positioning or radio network based positioning produces location information that could be used for various purposes such as for targeted advertising. Applications utilizing location information may request it from other applications or devices. For instance, an application in a first mobile terminal may show the location of a second device on a map, whereby the first terminal needs to request current location information from the second terminal. In a known network-based positioning system, these requests are delivered to a mobile network which then sends the location information to the first terminal, if submission of the location information has been authorized. If the submission has not been authorized, the mobile network may send an authorization request to the second terminal. The location information is then transmitted to the first terminal only if an authorization to do so is received from the second terminal.

Location information on a device is sensitive data, and it is important to provide means for controlling which entities have access to location information. In the above example, access control may be arranged by the second terminal receiving the location information request from the first terminal. The access control may be arranged in the second terminal by requesting authorization for sending the location information from the user of the second terminal or automatically by pre-determined rules determining whether the information may be sent. However, the usage of these access control methods has been cumbersome for the user, since new entries for access control information and the details thereof have to be manually entered from scratch.

BRIEF DISCLOSURE OF THE INVENTION

There is now provided an enhanced solution for arranging data retrieval as a response to a location information access request. This solution is achieved by a method, a data processing device, a system and a computer program product which are characterized by what is stated in the independent claims. Some embodiments of the invention are disclosed in the dependent claims.

The invention is based on the idea of utilizing existing contact information when processing location information access requests in a data processing device comprising a location information service module. An identifier in a received location information access request is determined and the identifier is compared to identifiers in a contact storage. Location access control information and/or supplementary contact information associated with an entry having the matching identifier in the contact storage is then retrieved.

The location information service module generally refers to any functionality suitable for serving external and/or internal location information access requests, and the contact storage generally refers to any storage suitable for storing entries comprising contact information. Location access control information refers to information on the basis of which access to the location information may be allowed or denied. It is to be noted that the location information access request may be a request for authorization of sending location information and/or a request for transmitting location information. Thus, it is not necessary to actually send any location information from a device receiving the request but the location information is sent to the requesting device by another entity, for instance by a location service element in a mobile network. This embodiment may be used in systems where the location information of the device is determined outside the device, for instance by network cell identification based positioning.

An advantage of an aspect of the invention is that less memory space is required since no separate entries are required for privacy profiles but already existing information in a data storage, such as phonebook contacts, may be utilized. Further, already existing information in the entries may be used when searching for the correct privacy profile for a sender of the location information access request. Information in the entries, such as a name and/or an image of the requesting person, may be displayed to the user, thereby enhancing usability. For instance, a nickname of a user of a terminal sending the request may be shown to the user instead of or in addition to the phone number of the user.

BRIEF DESCRIPTION OF THE DRAWINGS

In the following, the invention will be described in greater detail by means of some embodiments with reference to the accompanying drawings, in which.

DETAILED DESCRIPTION OF THE INVENTION

Figure 1:
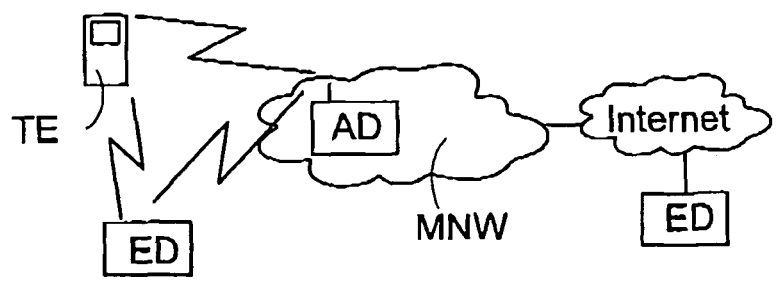
FIG. 1 shows a system in which location information may be transferred.

FIG. 1 illustrates an exemplary system in which location information on a data processing device TE may be transferred. The system comprises a mobile network MNW comprising an access device AD such as a base station, and one or more external devices ED. The location information of the data processing device TE may be requested by the external device ED. The external device ED may then utilize the received location information of the data processing device TE, possibly by forwarding the location information to other devices. In one embodiment, the external device ED may thus function as a server device and, contrary to the example in FIG. 3, reside in the mobile network MNW. In this embodiment, a location access request from the external device ED typically comprises an identifier of a device or a person (for instance a subscriber identity) for which the external device ED forwards the location information. In a further embodiment, the location of the data processing device TE is determined in the mobile network MNW. For instance, cell identification based positioning may be used, whereby the network MNW determines the position of the device TE according to the cell in which the device TE is registered. Another network-based positioning method is 'Time of Arrival' TOA), in which at least three fixed base stations (BS) of the network measure propagation delays of the signal transmitted from a terminal, by which delays the position of the terminal can be calculated accurately. E-OTD (Enhanced Observed Time Difference) is an example of a positioning method which uses both the device TE and the mobile network MNW. The external device ED may reside in another network, for instance in a secure intranet, typically accessible by via the Internet.

In one embodiment, data may be transmitted to/from the data processing device TE by a base station of a mobile network MNW. Conventional mobile network elements and functions may be included in the MNW. For instance, the MNW and the TE may support GSM (Global System for Mobile Communications), GPRS (General Packet Radio Service), 3GPP (3rd Generation Partnership Project) or WLAN (Wireless Local Area Network) standards. The data processing device TE may be a data processing device equipped with a location information service module, for instance a laptop, a desktop computer, a PDA device, a mobile station or a removable/portable module for some of the mentioned devices. This also applies to the external device ED. In one example, the other device to which the location information is ultimately transmitted is a mobile station or a PC with a browser by which a page indicating the location of the data processing device TE may be retrieved and presented. This page may be prepared by the ED and/or some other device implementing such a web based location informing service. Local connectivity may be arranged between the data processing device TE and the external device ED directly or via a third element. For this local area connectivity some local area networking technology may be utilized. For instance, IEEE 802.11i standard based WLAN connectivity or Bluetooth connectivity may be used.

Figure 2:
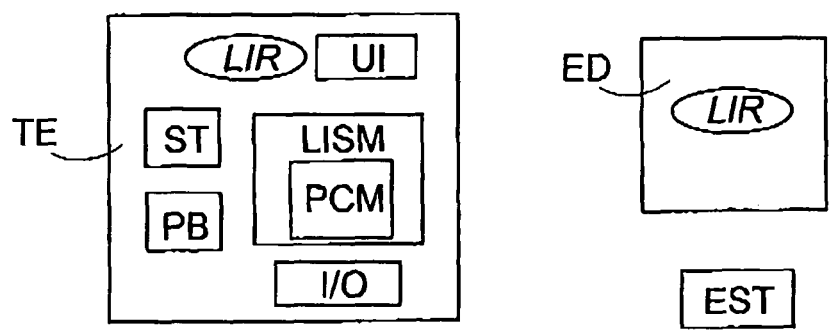
FIG. 2 is a block diagram illustrating a data processing device according to an embodiment of the invention.

FIG. 2 illustrates functional blocks of the data processing device TE relating to the present embodiment. The data processing device TE comprises a location information service module LISM, a storage herein referring to a phonebook storage PB for storing entries comprising contact information, a user interface UI, and I/O-means I/O such as a transceiver for wireless data transfer for arranging communication. It is to be noted that the contact information may reside in the phonebook storage PB or in another storage ST. Further, in one embodiment the data processing device TE comprises positioning means such as a GPS receiver for determining the location information on the TE (not shown in FIG. 2). The location information may be stored in the TE or in an external storage EST. The location information and/or authorization to deliver location information relating to the TE may be sent by the location information service module LISM to a requesting entity in the TE or in the external device ED, the entity requesting location information being represented in FIG. 2 by reference LIR (Location Information Inquirer). The LIR may be an application utilizing location information, for instance a guidance application. In one embodiment, the LISM comprises a specific privacy control module PCM for controlling access to location information on the basis of one or more stored privacy profiles. In an alternative embodiment, the location information on the TE is maintained by an external server, in which case the server may be configured to perform at least some of the features related to the location information access requests and illustrated in more detail in the following.

The data processing device TE comprises memory and a processing unit comprising one or more processors. Computer program codes executed in the processing unit may be used for causing the data processing device TE to implement means for controlling the serving of location access requests and the storing of access control rules, some embodiments of which are illustrated below in association with FIGS. 3, 4 and 5. In one embodiment, a chip unit or some other kind of module for controlling the data processing device TE may cause the device to perform the inventive functions. The module may form part of the device and it can be removable, i.e. it can be inserted into another unit or device. Computer program codes can be received via a network and/or be stored in memory means, for instance on a disk, a CD-ROM disk or other external memory means, from where they can be loaded into the memory of the data processing device TE. Hardware solutions or a combination of hardware and software solutions may also be used to implement the inventive functions. It is to be noted that the location information, contact information entries, access control information and/or the associations between the contact information entries and the access control information may be stored in internal memory or external memory (for instance a removable memory card or an IC card) of the data processing device TE, or in an external storage EST.

Figure 3:
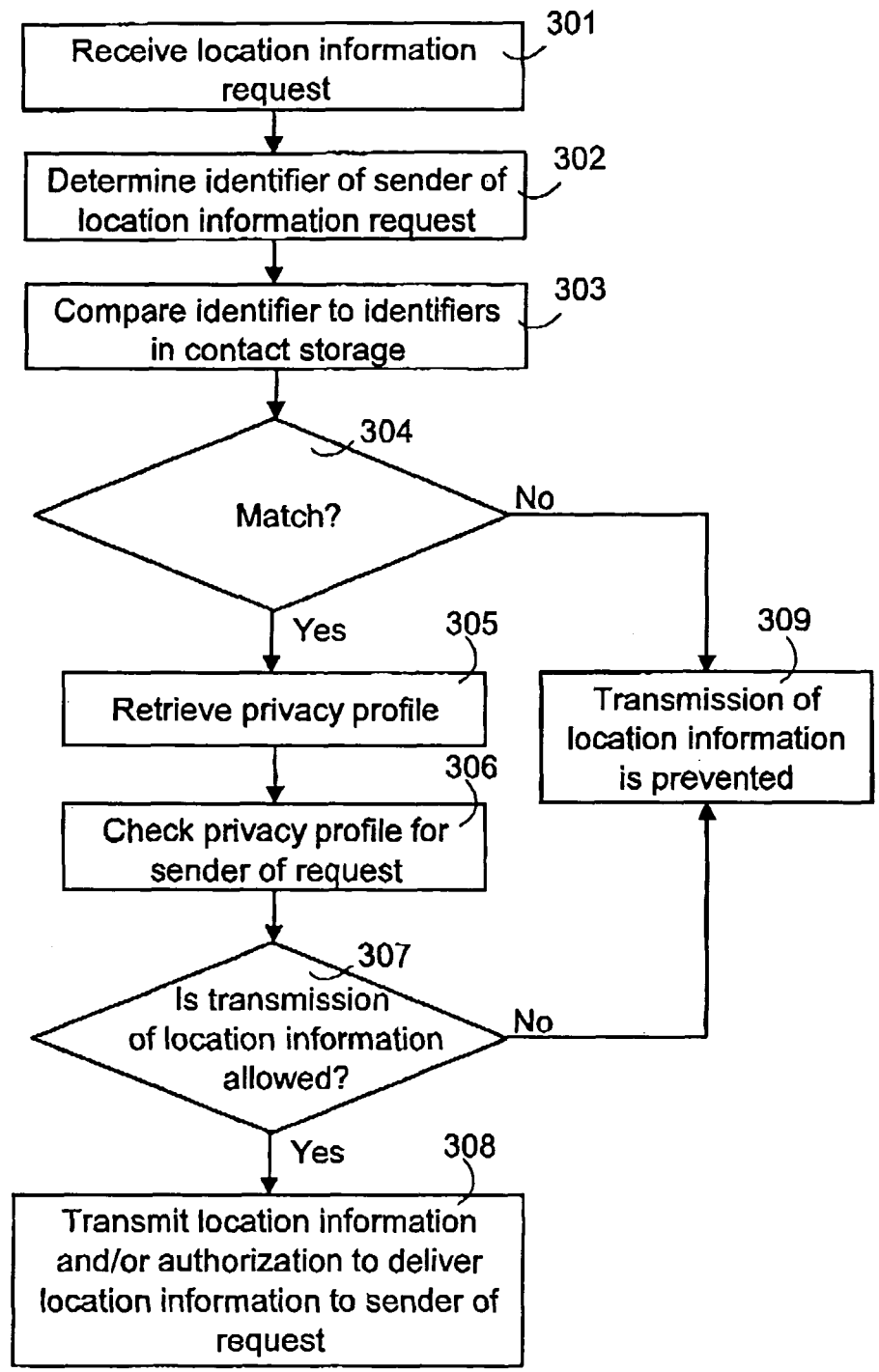
FIG. 3 is a flow diagram illustrating a method according to an embodiment of the invention.

FIG. 3 illustrates a method according to an aspect of the invention. In step 301, the device performing the method, in the present embodiment the data processing device TE, receives a location information access request in which, depending on the applied positioning technique, either a specific location of the data processing device TE or authorization to transfer location information on the data processing device is requested. The location information access request comprises at least an identifier of the sender of the request or an identifier of at least one entity on which location information is to be transferred. This identifier is determined from the request in step 302. In one embodiment, the identifier is an MSISDN (Mobile Subscriber International ISDN Number) determined from the location information access request sent by a mobile terminal or a location service element in the mobile network MNW. In a further embodiment, the request is sent by a short message, whereby the identifier may be determined in step 302 from a field containing the sender number in a short message comprising the location information access request. Many alternative embodiments also exist. For instance, a user name, a device identifier, an IP address, or some other identifier, which can be determined in a predetermined way from the location information, may be used. The identifier is compared 303, 304 to identifiers stored in the contact storage, in one embodiment in the phonebook PB.

If a match is found, the privacy profile associated with the entry having the matching identifier is retrieved in step 305. There are some alternatives as to how the privacy profile may be associated with the entry: The privacy profile may be directly stored in the entry comprising the matching identifier, e.g. in a phonebook PB entry, or the entry may comprise a link such as a URI (Uniform Resource Identifier) to the location of the privacy profile. In the former case, the data processing device TE may retrieve the entry or only the privacy profile in the entry. In the latter case, the correct privacy profile may then be retrieved from the linked location such as the storage ST in the TE or another, external, storage possibly EST residing in another device. It is also possible that the privacy profile comprises or is otherwise associated with at least one identifier of a contact entry, and the appropriate privacy profile is retrieved on the basis of this identifier.

In step 306, the retrieved privacy profile is checked for the sender of the request. If transmission of location information is allowed for the sender of the request (LIR) and/or the party for which the request has been sent on the basis of the check 306, 307, location information may then be transmitted 308 to the party originally desiring this information. According to the applied positioning technique, in this step 308 the data processing device 200 transmits the desired location information and/or authorization to deliver location information to the sender of the request.

Otherwise, if no match is found or if the transmission of location information is not allowed on the basis of the privacy profile, the request is denied and no location information or authorization to send location information is sent 309 to the sender of the request. Alternatively, a reject message may be sent to the sender of the request in step 309.

There are many alternatives as to how to implement the access control to location information on the basis of privacy profiles. At its simplest, the privacy profile merely indicates whether location information may or may not be transmitted to the associated sender of the request. The privacy profile may apply to a single entity, e.g. a specific entry in the phonebook PB, or to a plurality of entities, for instance a specific group such as 'family members'. More advanced access control rules may be defined by specific situations when the respective privacy profile applies and/or by specifying the circumstances that need to be met in order to allow submission of location information. For instance, the location information relating to a certain specific area may be determined as freely accessible location information or available, whereas the location of the device TE is to be kept secret when it resides in another area.

Figure 4:
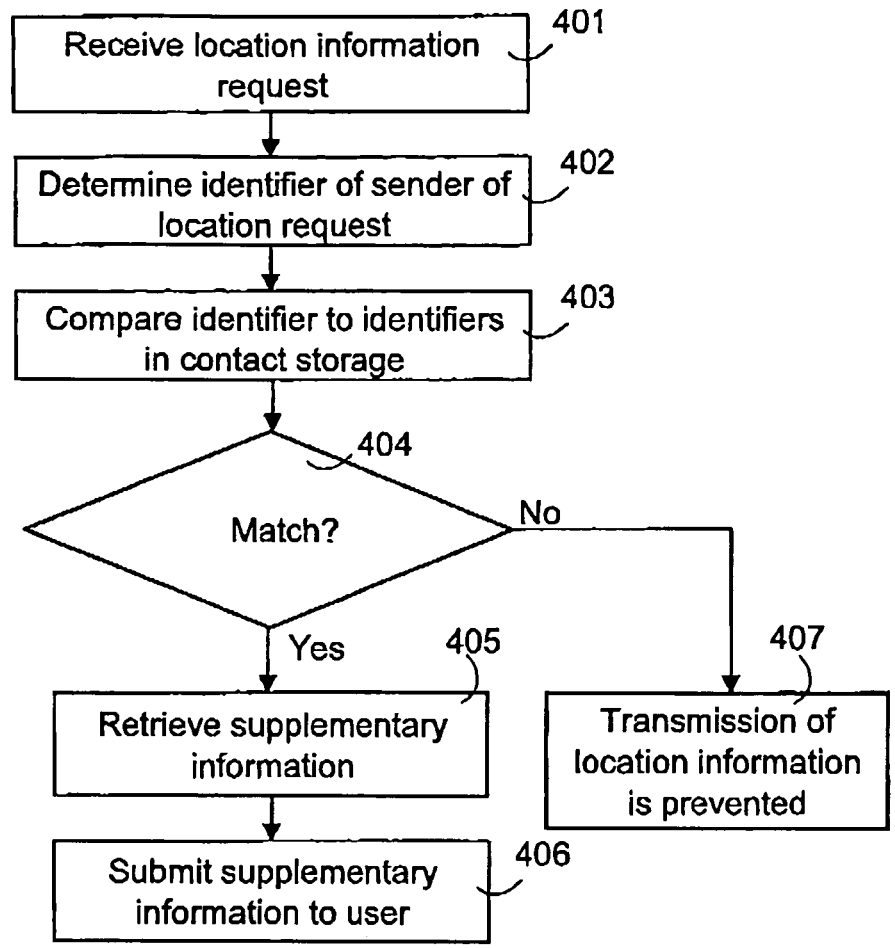
FIG. 4 is a flow diagram illustrating a method according to an embodiment of the invention.

FIG. 4 illustrates another embodiment which may be used in combination with or instead of the embodiment illustrated in FIG. 3. In a similar way to that in FIG. 3, a location information access request is received 401, the identifier in the request is determined 402 and compared 403, 404 to the identifiers in the contact storage. If a match is found, supplementary information associated with the identifier is retrieved in step 405. In step 406 the supplementary information is delivered to the user. Depending on the desired implementation, the supplementary data may comprise at least one of the following information types: main information, address information, a facsimile number, a phone or pager number, an e-mail address, URL (Uniform Resource Locator), an image file, or an audio file. In one embodiment, further facilitating recognition information, such as an associated image in or an image comprised in the entry having the matching identifier, is displayed to the user on a display of the user interface UI.

The supplementary data may be used merely for informative purposes, i.e. to indicate to the user of the TE that his/her location information is being/was sent to the entity represented by the contact entry. In another embodiment, before the location information and/or authorization may be transmitted to the sender of the request, a further checking step in addition to those in FIG. 3 is utilized, namely user authorization for the transmission of the location information. When supplementary information facilitating the recognition of the party for which location information is requested is delivered to the user, it is easier for the user to decide whether or not the location information can be transmitted.

If no match was found based on the check 403, 404, the location information access request is denied and the transmission of location information is prevented 407 for the entity identified in the location information access request.

According to another embodiment, location information is stored in the data processing device TE and associated with at least one entry in a contact storage PB, ST. This embodiment enables contact specific location information to be used. The location information may be stored in a contact entry or referred to in a contact entry. The location information may also be used as the supplementary data illustrated in the above embodiment.

In an embodiment, at least some of the features illustrated in FIGS. 3 and/or 4 are performed by the location information service module LISM of the data processing device TE. In a further embodiment, the privacy control module PCM performs the steps related to access control to location information. Referring to FIG. 3, the PCM may at least check the privacy profile 306 and indicate to another entity that the location information may be sent, or initiate the sending of the location information and/or authorization from the TE by giving a command to an entity controlling data transmission. It is to be noted that some features, for instance step 302/402 of determining the identifier of the sender, may be carried out by some other entity than the module LISM.

Figure 5:
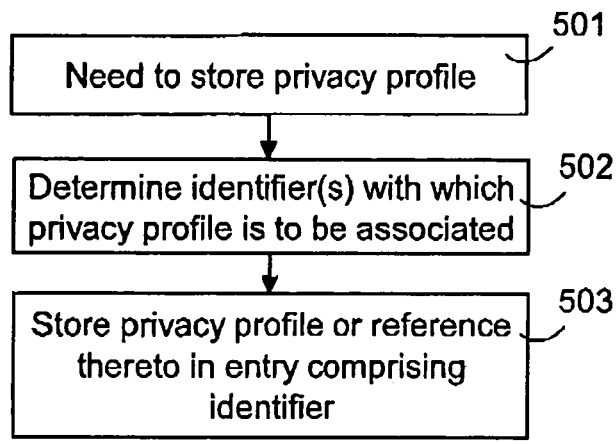
FIG. 5 is a flow diagram illustrating a privacy profile creation method according to an embodiment of the invention.

FIG. 3 thus illustrates the usage of already stored privacy profiles. According to an embodiment, the privacy profiles may be added, reviewed and/or modified by the user of the data processing device TE. FIG. 5 illustrates in more detail a privacy profile creation method according to an embodiment. The steps illustrated in FIG. 5 may be executed by the module LISM, the user interface UI module, or together by the module LISM and the user interface UI module. In step 501, a need exists to store a privacy profile. This step may be entered when the user has created a new privacy profile, modified an existing one, or when profile creation or modification is to be initiated.

In step 502, an identifier with which a privacy profile is to be associated is determined. Some identifiers with which the privacy profile may be associated directly or indirectly are illustrated in FIG. 3. In one embodiment, an input from the user is received via the user interface UI by which the identifier is determined. The data processing device TE may be configured to select automatically an appropriate identifier amongst the information in the entry of the phonebook PB, the entry being selected by the user via the user interface UI. It is to be noted that the identifier utilized when the storing the privacy profile may be different from the identifier used for retrieving the correct privacy profile. For instance, an identifier of the entry, such as a number, in which the privacy profile is to be stored, is used in steps 502, 503, whereas an MSISDN in the entry is used in steps 302 to 305 of FIG. 3 and in steps 402 to 405 of FIG. 4.

The privacy profile or reference thereto is stored 503 in the entry comprising the identifier. After the privacy profile or the reference to the privacy profile has been stored in the contact storage (ST, PB, EST), the above illustrated features may be utilized when receiving a location information access request comprising an identifier (of the sender or the party for which transmission of location information is requested), which is stored in the entry.

In one embodiment, the same privacy profile is stored for a plurality of entries. The identifier with which the privacy profile is to be associated may all be determined in step 502 by simply arranging selection of the desired contact entries from a displayed list of entries in the phonebook PB. The privacy profile or reference thereto may then be stored in all the selected entries in step 503. This embodiment enables an easy option for determining the same access control rules for a number of entities. In a further embodiment, a predetermined group of entries may be stored with the same privacy profile, whereby a group identifier may be used in steps 502 and 503.

The access to and the storing of the privacy profiles may also be arranged in connection with the embodiment in FIG. 5 via the location information serving module LISM, or more specifically by the privacy control module PCM. Preferably, access to and storing of location information and/or privacy profiles is only allowed for the LISM so that security can be enhanced by centralized control.

In one embodiment, the privacy profile is determined by the user interface UI module when an input from the user of the data processing device TE is received concerning one or more access control rules and/or one or more contact entries to which the privacy profile is to be applied. Thus, the user interface UI module may give the respective identifier in or of the entry in the contact storage (in one embodiment the phonebook PB) to the module LISM. The LISM may then store the privacy profile in the respective entry in the contact storage or in another storage inside or outside the data processing device TE. Correspondingly, when a need exists to retrieve a privacy profile on the basis of an input from the user, for instance when the user wishes to check or modify the privacy profile, the user interface UI may issue a request comprising the respective identifier to the LISM. Similarly, as in steps 302 to 305, the LISM may then retrieve the privacy profile which is stored in the contact storage entry comprising the identifier in the request, or which is associated with the identifier. The retrieved privacy profile may then be delivered to the user interface UI module which may display it to the user in the display of the data processing device TE.

In one embodiment, security restrictions may be applied in the location information access module LISM for controlling the access to the privacy profiles to be allowed only for trusted entities. Thus, the LISM (preferably the PCM) checks whether the request is coming from an entity allowed to request this information. It is to be noted that this embodiment may supplement the one illustrated in FIG. 3, i.e. the sender of the location information access request (for instance a wireless terminal being the external device ED) and the entity from which the request for privacy profile is received (for instance the user interface UI component) need to be authorized. Various security levels may also be determined. Possible levels might include modification rights only for one entity, for instance a system user interface, and read-only access for others. This embodiment enables an enhanced security level to be used and unauthorized modifications of the access control rules relating to location information to be prevented.

The applicability of the invention is not limited to any specific content format. In one embodiment, the data processing device TE is configured to store and utilize entries in the contact storage PB, ST in accordance with some version of vCard format specifying a format for electronic business cards. The vCard version 3.0 specification is defined in IETF RFC 2425 and RFC 2426. The privacy profile or any other kind of location information access control related data referred to above may be stored as a new content type or property for the vCard format, or an extension mechanism enabled by the private types in Chapter 3.8 in RFC 2426.

It will be obvious to a person skilled in the art that as technology advances, the inventive concept can be implemented in various ways. The invention and its embodiments are not limited to the examples described above but may vary within the scope of the claims. Different features may thus be omitted, modified or replaced by equivalents.

What is claimed is:

1. A method of managing location information access requests comprising:
   receiving, at a first user device via a network, a request for location information of a first user of the first user device from a second user device, the first user device having a processor and an internal storage, wherein the location information is stored in the internal storage or an external storage, and the request includes at least an identifier of a second user of the second user device, and wherein the processor causing:
   determining that the identifier is in a contact database of the first user and that access control information of the identifier stored in the contact database indicates that the second user is authorized to receive the location information;
   upon the determining causing, (1) rendering on a user interface of the first user device one or more image files, one or more audio files, or a combination thereof that facilitate recognition of the second user by the first user, in addition to a name and a telephone number corresponding to the identifier, and (2) prompting on the user interface for user confirmation of the recognition of the second user and transmitting the location information to the second user device; and
   determining whether to transmit the location information from the internal storage or the external storage via the network to the second user device based, at least in part, on the user confirmation.

2. A method of claim 1, wherein the processor further causing:
   retrieving locally from the internal storage of the first user device the access control information of the identifier based, at least in part, on the determining that the identifier is in the contact database.

3. A method of claim 1, wherein the processor further causing:
   retrieving locally at the first user device the location information of the first user device from a GPS receiver of the first user device.

4. A method of claim 1, wherein the processor further causing:
   determining that the identifier is in the contact database and that the access control information of the identifier indicates that the second user device is not authorized to receive the location information; and
   determining not to transmit the location information to the second user device,
   wherein the contact database includes one or more phonebook entries, and the network includes a wireless network.

5. A method of claim 1, wherein the processor further causing:
   further rendering on the user interface supplementary contact information corresponding to the identifier based, at least in part, on the determining that the identifier is in the contact database.

6. A method of claim 5, wherein the processor further causing:

associating an identical privacy profile with the identifier and one or more other identifiers in the contact database as a part of the access control information; and transmitting the location information via a web browser to the second user device based, at least in part, on the user confirmation.

7. A method of claim 1, wherein the processor further causing:

retrieving the location information of the first user device from the external storage, wherein the external storage is a removable memory card or an IC card; and transmitting the location information retrieved from the external storage via the network to the second user device based, at least in part, on the user confirmation.

8. A method of claim 5, wherein the supplementary contact information includes address information, location information, one or more email addresses, one or more uniform resource locators or a combination thereof, corresponding to the identifier.

9. A method of claim 1, wherein the processor further causing:

transmitting, from the first user device, to the second device an authorization to transmit the location information of the first device to a third device.

10. An apparatus comprising:

at least one processor; and at least one memory including computer program code for one or more programs, the at least one memory and the computer program code configured to, with the at least one processor, cause the apparatus embedded in a first user device to manage location information access requests by performing at least the following;

receiving, via a network, a request for location information of the first user of the first user device from a second user device, wherein the location information is stored in an internal storage or an external storage, and the request includes at least an identifier of a second user of the second user device;

determining that the identifier is in a contact database of the first user and that access control information of the identifier stored in the contact database indicates that the second user is authorized to receive the location information;

upon the determining causing, (1) rendering on a user interface of the first user device one or more image files, one or more audio files, or a combination thereof that facilitate recognition of the second user by the first user, in addition to a name and a telephone number corresponding to the identifier, and (2) prompting on the user interface for user confirmation of the recognition of the second user and transmitting the location information to the second user device; and determining whether to transmit the location information from the internal storage or the external storage via the network to the second user device based, at least in part, on the user confirmation.

11. An apparatus of claim 10, wherein the apparatus is further caused to perform:

retrieving locally from the internal storage of the first user device the access control information of the identifier based, at least in part, on the determining that the identifier is in the contact database.

12. An apparatus of claim 10, wherein the apparatus is further caused to perform:

retrieving locally at the first user device the access control information of the identifier based, at least in part, on the determining that the identifier is in the contact database.

13. An apparatus of claim 10, wherein the contact database includes one or more phonebook entries, and the network includes a wireless network.

14. An apparatus of claim 10, wherein the apparatus is further caused to perform:

further rendering on the user interface supplementary contact information corresponding to the identifier based, at least in part, on the determining that the identifier is in the contact database, to facilitate the recognition of the second user.

15. An apparatus of claim 14, wherein the apparatus is further caused to perform:

associating an identical privacy profile with the identifier and one or more other identifiers in the contact database as a part of the access control information; and transmitting the location information via a web browser to the second user device based, at least in part, on the user confirmation.

16. An apparatus of claim 10, wherein the apparatus is further caused to perform:

retrieving the location information of the first user device from the external storage, wherein the external storage is a removable memory card or an IC card; and transmitting the location information retrieved from the external storage via the network to the second user device based, at least in part, on the user confirmation.

17. An apparatus of claim 14, wherein the supplementary contact information includes address information, location information, one or more email addresses, one or more uniform resource locators or a combination thereof, corresponding to the identifier.

18. An apparatus of claim 10, wherein the apparatus is further caused to perform:

transmitting to the second device an authorization to transmit the location information of the first device to a third device.

19. A non-transitory computer-readable storage medium carrying one or more sequences of one or more instructions which, when executed by one or more processors, cause an apparatus embedded in a first user device to at least manage location information access requests by performing the following steps:

receiving, via a network, a request for location information of the first user of the first user device from a second user device, wherein the location information is stored in an internal storage or an external storage, and the request includes at least an identifier of a second user of the second user device;

determining that the identifier is in a contact database of the first user and that access control information of the identifier stored in the contact database indicates that the second user is authorized to receive the location information;

upon the determining, (1) rendering on a user interface of the first user device one or more image files, one or more audio files, or a combination thereof that facilitate recognition of the second user by the first user, in addition to a name and a telephone number corresponding to the identifier, and (2) prompting on the user interface for user confirmation of the recognition of the second user and transmitting the location information to the second user device; and determining whether to transmit the location information from the internal storage or the external storage via the network to the second user device based, at least in part, on the user confirmation.

20. A non-transitory computer-readable storage medium of claim 19, wherein the apparatus is caused to further perform:

retrieving locally from the internal storage of the first user device the access control information of the identifier based, at least in part, on the determining that the identifier is in the contact database.

21. A non-transitory computer-readable storage medium of claim 19, wherein the apparatus is caused to further perform:

retrieving locally at the first user device the location information of the first user device from a GPS receiver of the first user device.

22. A non-transitory computer-readable storage medium of claim 19, wherein the contact database includes one or more phonebook entries, and the network includes a wireless network.

23. A non-transitory computer-readable storage medium of claim 19, wherein the apparatus is caused to further perform:

further rendering on the user interface supplementary contact information corresponding to the identifier based, at least in part, on the determining that the identifier is in the contact database, to facilitate the recognition of the second user.

24. A non-transitory computer-readable storage medium of claim 23, wherein the apparatus is caused to further perform:

associating an identical privacy profile with the identifier and one or more other identifiers in the contact database as a part of the access control information; and transmitting the location information via a web browser to the second user device based, at least in part, on the user confirmation.

25. A non-transitory computer-readable storage medium of claim 19, wherein the apparatus is caused to further perform:

retrieving the location information of the first user device from the external storage, wherein the external storage is a removable memory card or an IC card; and transmitting the location information retrieved from the external storage via the network to the second user device based, at least in part, on the user confirmation.

* * * * *